United States Patent [19]

Kytta

[11] Patent Number: 4,535,679
[45] Date of Patent: Aug. 20, 1985

[54] CONTROL VALVE FOR A BRAKE BOOSTER
[75] Inventor: Oswald O. Kytta, South Bend, Ind.
[73] Assignee: The Bendix Corporation, Southfield, Mich.
[21] Appl. No.: 307,919
[22] Filed: Oct. 2, 1981
[51] Int. Cl.$^3$ .............................................. F15B 9/10
[52] U.S. Cl. ................................................ 91/376 R
[58] Field of Search ................. 91/369 A, 374, 376 R, 91/369 B

[56] References Cited

U.S. PATENT DOCUMENTS

| 4,005,638 | 2/1977 | Takeuchi | 91/376 R X |
|---|---|---|---|
| 4,066,005 | 1/1978 | Farr | 91/369 B |
| 4,237,770 | 12/1980 | Harrison et al. | 91/369 A |
| 4,282,799 | 8/1981 | Takeuchi | 91/369 A |
| 4,350,077 | 9/1982 | Takeuchi | 91/376 R |

Primary Examiner—Robert E. Garrett
Assistant Examiner—Abram M. Bradley
Attorney, Agent, or Firm—Leo H. McCormick, Jr.; Ken C. Decker

[57] ABSTRACT

A control valve 44 for use in a fluid pressure operated motor 10 to control the communication of fluid between first and second chambers 34 and 36. The control valve 44 includes a plunger 58, a disc 46 and a retainer 70. The retainer 70 has a cylindrical body 82 with an inwardly projecting lip of which section 84 engages and holds the peripheral surface 48 against shoulder 78 on the hub 26 and an end section 94 which acts as a stop to limit the movement of plunger 58 in bore 38 when the valve 44 is in the released position. Tabs 100, 100'. . . 100$^N$ on sleeve or cylinder 82 are located in groove 102 to lock the retainer 70 in place. In response to an input, push rod 56 moves plunger 58 to allow disc 46 to move and initially interrupt communication of a first fluid between the first and second chamber 34 and 36 and thereafter permit a second fluid to flow into the second chamber 36. With the first fluid in the first chamber 34 and the second fluid in the second chamber 36, a pressure differential is developed such that wall 30 and hub 24 move to provide push rod 64 with an output force.

12 Claims, 5 Drawing Figures

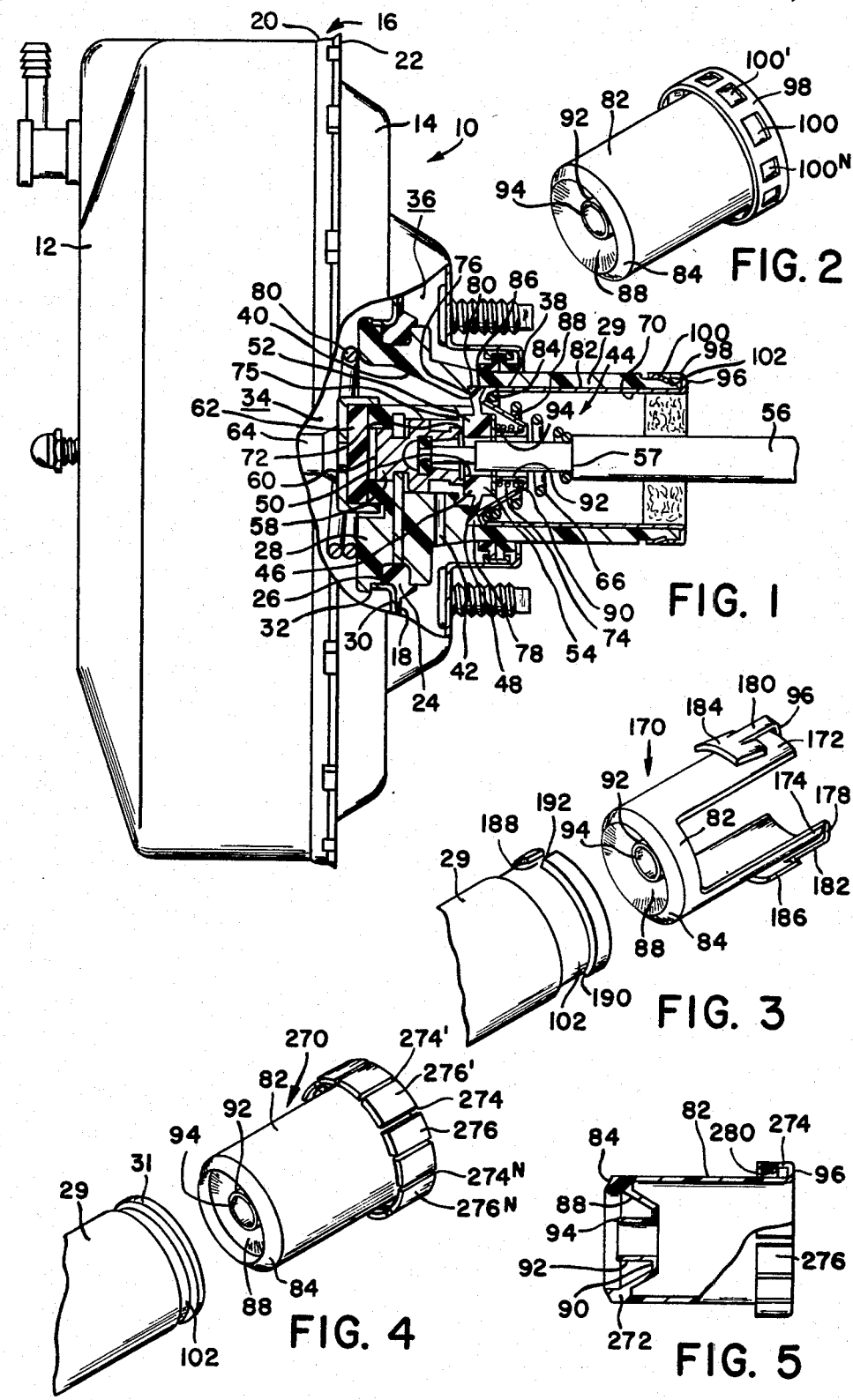

CONTROL VALVE FOR A BRAKE BOOSTER

BACKGROUND OF THE INVENTION

The present invention relates to a control valve for use in a brake booster.

In such brake boosters, the control valve in a first mode of operation responds to control the communication of fluid through a hub from a first source of fluid to both sides of a movable wall that separates a cavity in a housing into first and second chambers and in a second mode of operation responds to control fluid from a second source to the second chamber to create a pressure differential across the movable wall. The pressure differential acts on the movable wall to produce an output force corresponding to an input force applied to operate the control valve in the second mode.

In an effort to reduce the overall dimension of the control valve it has been disclosed in U.S. Pat. No. 4,237,770 issued Dec. 9, 1980 that a resilient disc would respond to control the communication of fluid between first and second chambers to develop an operational pressure differential in response to an operator input. It was evident that the size of the control valve could be further reduced if the slot in the hub for the retention key for the plunger were eliminated.

SUMMARY OF THE INVENTION

An advantageous effect of this invention occurs through the elimination of the slot in the hub to reduce the overall axial dimension of a control valve while simplifying the construction thereof.

This advantageous effect is achieved in accordance with the teaching of this invention by providing a control valve for use in a fluid pressure operated motor having a housing with a cavity therein separated by a wall to define first and second chambers. A hub connected to the wall has a projection that extends through the end plate of the housing. The projection has a bore therein through which the first and second chambers are connected to each other in a first mode of operation and said first chamber is connected to a source of fluid in a second mode of operation. The control valve controls the fluid communication through said bore in response to a force applied to an input member to terminate the first mode of operation and initiate the second mode of operation whereby a pressure differential develops across the wall and an output force is produced on movement of the wall.

The control valve is characterized by: a plunger located in the bore; a disc having a peripheral surface that engages the bore and a central opening; and a retainer connected to the projection for holding the peripheral surface of the disc against a shoulder in the bore to fix the position of the disc within the bore. The retainer has a centrally projecting lip that extends into the bore. The plunger contacts the disc adjacent its central opening and moves the disc into engagement with the lip on the retainer during the first mode of operation. The plunger moves away from the disc during the second mode of operation to allow fluid to flow through the central opening and into the first chamber to permit the development of the pressure differential.

The centrally projecting lip which extends from a sleeve of the retainer has a first conical surface separated from a second conical surface by an apex section. The first conical surface acts as a guide for a first resilient member that acts on and moves an input push rod connected to the plunger and disc against a stop formed by the peripheral surface of the second conical surface. The sleeve has a series of tabs that engage the projection to assure that the stop remains in the same position in the bore after repeated cycling between the released and activated position for the control valve.

A further advantageous effect of this invention results in the method of locating and retaining a disc and plunger within a bore of a hub by a retainer.

It is thus an object of this invention to provide a fluid pressure operated motor with a control valve that is retained in a bore by a sleeve that has tabs that engage a projection extending from a hub attached to a movable wall in the motor.

These advantages and objects of this invention should be apparent from reading the specification while viewing the accompanying drawings.

BRIEF DESCRIPTION OF THE DRAWINGS

FIG. 1 is a sectional view of a fluid pressure operated motor having a valve therein made according to the principles of this invention;

FIG. 2 is a perspective view of the retainer that holds the disc and plunger in the bore of the hub of FIG. 1.

FIG. 3 is another embodiment of a retainer for holding a disc and plunger in the bore of the hub of FIG. 1;

FIG. 4 is a still further embodiment of a retainer for holding a disc and plunger in the bore of the hub of FIG. 1; and FIG. 5 is a sectional view taken along line 5—5 of FIG. 4.

DETAILED DESCRIPTION OF THE INVENTION

The fluid pressure motor 10 has a first shell 12 joined to a second shell 14 by a closure arrangement 16 which is disclosed in U.S. Pat. No. 3,977,299. A diaphragm 18, which has a first bead held by the closure arrangement 16 formed by the shoulder 20 on the first shell 12 and peripheral surface 22 on the second shell 14 has a second bead 24 located in groove 26 on hub 28 to position plate 30 against shoulder 32. The plate 30, diaphragm 18 and hub 28 divide the interior of the first and second shells 12 and 14 into a first chamber 34 and a second chamber 36.

The hub 28 has a stepped bore 38 therethrough which is connected to the first chamber 34 by a first passage 40 and to the second chamber 36 by a second passage 42. A valve arrangement 44, which is located in bore 38, controls the flow communication between the first and second chambers 34 and 36, respectively, through the first and second passages 40 and 42.

The valve arrangement 44 is connected to an input push rod 56 through a plunger 58. Plunger 58 has a face 60 which engages reaction disc 62 located in bore 38 to provide an operator with a feedback force corresponding to the ouput force being transmitted from the fluid pressure motor through output push rod 64.

In more particular detail, the valve arrangement 44 includes a disc 46 of the type disclosed in U.S. Pat. No. 4,237,770 the plunger 58, retainer 70, first and second springs 66, and 74, and push rod 56.

Disc 46 has a peripheral surface 48 that engages bore 38 and shoulder 76, and a central opening 50. Ribs 52 and 54 extend from the central opening 50 toward the peripheral surface 48. Rib 52 functions as both the atmospheric and vacuum seat while rib 54 is both a spring seat and a stop surface. Shoulder 76 has a taper thereon that substantially matches surfaces 80 on bead 78.

The retainer 70 includes a sleeve on cylindrical body 82 that forms an interference fit with bore 38. The first end of the cylindrical body 82 has an inwardly projecting lip with slanting section 84 that matches surface 86 on bead 78 of disc 46. At a point adjacent the end of bead 78, surface 84 on lip reverses to form a cone 88 that projects rearwardly for the first end toward the second end. The apex 90 of cone 88 occurs at about midway into the bore 38 and again reverses direction to establish a cylindrical member 92 that extends toward the first end to define a stop 94.

The second end of the sleeve or cylindrical body 82 has a flange 96 that projects radially to a point and then is joined with a cylindrical section 98. A series of tabs 100, 100' ... 100$^N$ as best shown in FIG. 2, located on cylindrical section 98 extend into a groove or slot 102 on projection 29 of hub 28 to compress bead 78 between surface 84 and shoulder 76. The cone 88 acts as as guide to assist in locating spring 66 between section 84 on the lip of sleeve 82 and rib 57 on push rod 56. While the apex 90 between cones 88 and cylindrical member 92 align spring 74 with surface 54 on disc 46.

MODE OF OPERATION OF THE INVENTION

The fluid pressure motor 10 is normally installed as a power assist device in the brake system of a vehicle. When such a vehicle is operating, a first fluid, normally the vacuum produced at the intake manifold, is communicated to the first chamber 34. Thereafter, the fluid in pressure motor 10 is evacuated by flowing from the second chamber 36 through the second passage 42, the sealed portion of bore 38, the first passage 40 and the first chamber 34 to suspend the movable diaphragm 18 and backing plate 30 in the first fluid. With the movable diaphragm 18 and backing plate 30 suspended in the first fluid, return spring 80 urges the hub 28 toward shell 14.

In the first mode of operation, as shown in FIG. 1, there is no input applied to push rod 56. Thus, return spring 66 moves plunger face 60 against rib 52 to seal the flow path between the first and second passages 40 and 42 from being exposed to a second fluid, air at atmospheric pressure, in the opened portion bore 38. Rib 54 on disc 46 engages stop 94 to limit the rearward movement of plunger 58 by return spring 66. The second fluid (air) in bore 38 and the first fluid (vacuum) in the first passage 40 create a pressure differential across disc 46 that assist spring 74 in urging the face on rib 52 into engagment with face 60 on plunger 58 to reinforce the seal between bore 38 and the flow path between the first and second passages 40 and 42.

When an operator desires to effect a brake application, an input force acts on push rod 56 to move plunger 58 toward the reaction disc 62. The internal resiliency of the disc 46 and the pressure differential thereacross and spring 74 move rib 52 with face 72 until rib 52 engages seat 75. Thereafter, plunger 58 moves away from rib 52 and allow the second fluid to flow into the second passage 42 for distribution to the second chamber 36. With the second fluid air at atmospheric pressure, in the second chamber 36 and the first fluid, air reduced to the level of the vacuum produced at the intake manifold or vacuum produced by an air pump, in the first chamber 34, a pressure differential is created across the diaphragm 18 and backing plate 30. This pressure differential acts on the diaphragm 18 and backing plate 30 to develop an operational force corresponding to the input force that is transmitted to the output push rod 64 by way of hub 28 and reaction disc 62. The resistance to movement of push rod 64 is carried through reaction disc 62 and into plunger 58 to provide the operator with an indication of the operational force supplied to the push rod 64.

On termination of the input force, return spring 66 acts on push rod 56 to move face 72 on plunger 58 out of engagement with reaction disc 62 and face 60 into engagement with rib 52 to interrupt flow communication of the second fluid through the axial opening 50. Thereafter, rib 52 moves away from seat 75 to re-establish flow communication between the first passage 40 and the second passage 42 through bore 38. With flow communication unrestricted between the first passage 40 and the second passage 42, the second fluid in chamber 36 is evacuated by the first fluid to suspend the diaphragm 18 and backing plate 30 in the first fluid and allow return spring 80 to move hub 28 toward shell 14. Thereafter, the diaphragm 18 and hub 28 assume a position as shown in FIG. 1 until the operator again applies an input force to push rod 56.

Thus, the operation of fluid pressure motor 10 by valve 44 is achieved through sequential movement away from seat 75 by spring 66 acting through push rod 56 and plunger 58 to provide free communication between the first and second chambers and through the internal resiliency of the disc and spring 74 aided by any pressure differential between the first fluid and the second fluid to seat the face of rib 52 on seat 75, and seal the first passage 40 from the bore 38. With passage 40 sealed, the second fluid is communicated to the second chamber whereby a fluid pressure differential is developed to produce the output force transmitted through push rod 64.

Thus, the cylindrical retainer 70 performs the dual function of holding and locating the disc 46 in a fixed position within bore 38 in addition to establishing the rest position of plunger 58 in bore 38.

The groove formed by cylindrical member 24, flange 96 and cylinder or sleeve 70 covers the second end of projection 29 to provide protection against damage.

In order to conserve material and reduce the total weight of the servomotor 10, the structure of the retainer 70 was modified in a manner as ahown in FIG. 3 for retainer 170.

In retainer 170, the cylindrical body 82 has a pair of arms 172 and 174 extending therefrom. Flanges 176 and 178 attached to arms 172 and 174, respectively, have projections 180 and 182 to which tabs 184 and 186 are attached. Projection 29 on hub 28 has slots 188 and 190 that extend from the end 192 to groove 102. When the cylindrical body 82 is located in the bore of projection 29, projections 180 and 182 are located in slots 188 and 190, respectively, and tabs 184 and 186 snap into groove 102 to lock or attach retainer 170 thereto. The operation of the valve arrangement is identical whether retainer 70 or retainer 170 is used in the servomoter 10.

While it is anticipated that the retainers 70 and 170 would be stamped out of metal it may be desirable to make a retainer out of a plastic material through molding. The retainer 270 shown in FIG. 4 illustrates such a plastic or molded retainer. Because of the elastic properties of plastic it is necessary for the end 272 as best shown in FIG. 5 to be reinforced. In addition axial slots 274, 274' ... 274$^N$ are cut between tabs 276, 276' ... 276$^N$. When cylinder 82 is inserted in the bore of projection 29 on hub 28, tabs 276, 276′ . . . 276$^N$ flex about flange connections to allow nibs 280, only one of which is shown, to move over rib 31 before supplying into groove 102 to lock the retainer 270 in place. Since the material in hub 28 and retainer 270 could be constructed from the same plastic any expansion force which may occur because of the operating conditions encountered by the servomotor 10 would be reduced or eliminated. However for most purposes, the metal retainer 70 and 170 because of their ease in manufacture, would appear to be the type utilized for most applications.

I claim:

1. A control valve for use in a fluid pressure operated motor having a housing with a cavity therein separated by a wall to define first and second chambers therein, a hub connected to said wall having a projection that extends through the housing, said projection having a bore therein through which the first and second chambers are connected to each other in a first mode of operation and said first chamber is connected to a source of fluid in a second mode of operation, said control valve controlling the fluid communication through said bore in response to force applied to an input member to terminate said first mode of operation whereby a pressure differential develops across said wall and an output force is produced, said valve being characterized by:
   a plunger located in said bore;
   a disc having a central opening and a peripheral surface;
   a retainer connected to said projection for holding said peripheral surface against a shoulder to fix the position of the disc within said bore, said retainer having an inwardly projecting lip, said plunger contacting said disc adjacent said central opening and moving the disc against said lip on the retainer during said first mode of operation and said plunger moving away from said disc during said second mode of operation to allow fluid to flow through said central opening and into said first chamber to develop said pressure differential;
   a first resilient member located between said inwardly projecting lip and said input member for urging said plunger toward said disc and said lip, said lip limiting the movement of said disc toward said retainer and establish a rest position for said disc during said first mode of operation; and
   a second resilient member located between said retainer and said disc for urging said disc toward a seat during said second mode of operation to seal said second chamber from said bore.

2. The control valve, as recited in claim 1, wherein said retainer is characterized by:
   a sleeve having radial tabs extending therefrom, said tabs extending into a groove in said projection to fix the sleeve to said hub.

3. The control valve as recited in claim 2 wherein said sleeve is characterized by:
   a flange that is located on the end thereof that engages the end of said projection on the hub.

4. The control valve as recited in claim 3 wherein said retainer is characterized by:
   a first cylindrical member concentrically positioned in said bore having a first end and a second end, said centrally projecting lip extending from said first end, said projecting lip providing a guide for said first and second resilient members.

5. A brake booster having a housing with a cavity therein separated by a wall to define first and second chambers therein, a hub connected to said wall having a projection with a bore therein, said hub having a first passage that connects said first chamber to said bore and a second passage that connects said second chamber to said bore, said hub having an annular seat located between said first and second passages, said wall being moved by a pressure differential produced when communicated by way of the first passage bore and second passage, between said first and second chambers is interrupted and a fluid is communicated to said first chamber by way of the bore and first passage, the improvement comprising:
   a plunger located in said bore and connected to an input member;
   a disc having a head on its peripheral surface and a central opening;
   a sleeve having a first end and a second end, said first end having a cone extending inwardly toward said second end for a distance with a cylindrical lip attached thereto which extends back toward said first end, said second end having a flange, said flange being connected to a cylindrical section which is substantially concentric to said sleeve and extending in a direction from said second end toward said first end, said first end engaging said first bead to position said disc within said bore when the end of said projection engages said flange, said plunger engaging and moving said disc against said cylindrical lip to permit communication between said first and second chamber and said plunger being disengaged from said disc to allow said disc to move from said cylindrical lip and into engagement with said annular seat to seal said first passage and thereafter allow fluid to flow through said central opening for distribution to said first chamber.

6. In the brake booster, as recited in claim 5 wherein said sleeve further includes:
   tabs connected to said flange, said tabs extending into slots on said projection to lock the sleeve onto said hub.

7. In the brake booster, as recited in claim 6 further including:
   a first resilient member located between said first end of said sleeve and said input member, said first resilient member urging said plunger toward said cylindrical lip to seal said bore from said first and second passages while limiting the movement of the plunger within said bore.

8. In the brake booster, as recited in claim 7 further including:
   a second resilient member located between the intersection of said cone and cylindrical lip and said disc for urging said disc toward said annular seat to seal said first passage from said bore during communication of fluid through said central opening.

9. In the brake booster, as recited in claim 8 wherein said cone and cylindrical lip support said first and second resilient members during movement of said disc and plunger within said bore.

10. In the brake booster, as recited in claim 5 wherein said sleeve further includes tabs connected to said flange, said tabs being separated by a series of axial slots that allow the tabs to radially expand and be moved into a groove on the hub to lock the sleeve onto said hub.

11. In the brake booster as recited in claim 5 wherein said sleeve has a cylindrical body with arms extending therefrom to which said flange is attached.

12. In the brake booster as recited in claim 11 wherein said hub has a series of axial slots that are connected to a groove, each of said tabs have a link that is located in a corresponding axial slot when the tabs are in the groove to establish a compact structure.

* * * * *